US010872144B1

(12) United States Patent
Kalibjian et al.

(10) Patent No.: US 10,872,144 B1
(45) Date of Patent: Dec. 22, 2020

(54) SYSTEMS AND METHODS FOR SECURE PROCESSING OF DATA STREAMS HAVING DIFFERING SECURITY LEVEL CLASSIFICATIONS

(71) Applicant: Ent. Services Development Corporation LP, Houston, TX (US)

(72) Inventors: Jeff Kalibjian, Pleasanton, CA (US); Scott Lopez, Frisco, TX (US); Peter Eugene Schmidt, II, Saginaw, MI (US); Mari Mortell Kwee, San Diego, CA (US)

(73) Assignee: Ent. Services Development Corporation LP, Houston, TX (US)

( * ) Notice: Subject to any disclaimer, the term of this patent is extended or adjusted under 35 U.S.C. 154(b) by 464 days.

(21) Appl. No.: 15/834,258

(22) Filed: Dec. 7, 2017

(51) Int. Cl.
*G06F 21/00* (2013.01)
*G06F 21/52* (2013.01)
*G06F 21/57* (2013.01)

(52) U.S. Cl.
CPC .............. *G06F 21/52* (2013.01); *G06F 21/57* (2013.01); *G06F 2221/033* (2013.01)

(58) Field of Classification Search
None
See application file for complete search history.

(56) References Cited

U.S. PATENT DOCUMENTS

| 7,379,916 | B1 * | 5/2008 | Mizrah | G06Q 20/04 235/379 |
| 9,736,147 | B1 * | 8/2017 | Mead | H04L 63/083 |
| 10,275,604 | B2 * | 4/2019 | Lopez | G06F 21/602 |
| 2006/0136317 | A1 * | 6/2006 | Mizrah | G06Q 40/00 705/35 |
| 2006/0294235 | A1 | 12/2006 | Joseph | |
| 2008/0010642 | A1 | 1/2008 | MacLellan | |

(Continued)

FOREIGN PATENT DOCUMENTS

| EP | 1223524 | 7/2002 |
| EP | 3179690 | 6/2017 |

OTHER PUBLICATIONS

International Application No. PCT/US2018/064344, International Search Report and Written Opinion dated Mar. 22, 2019.

*Primary Examiner* — Jeffery L Williams
(74) *Attorney, Agent, or Firm* — Sheppard Mullin Richter & Hampton LLP (57) ABSTRACT

Systems, methods, and non-transitory computer-readable media can receive a notification of a user request to securely process a first set of data. A time estimate is calculated, wherein the time estimate is indicative of an expected amount of time for a secure data processing application to process the first set of data. An actual utilization time required for a first instance of the secure data processing application to process the first set of data is measured. A determination is made as to whether the secure data processing application may be compromised based on a comparison of the time estimate and the actual utilization time. In various embodiments, a re-cryptor process is used to change the cryptographic keys accessed by the secure data processing application. In various embodiments, a re-credentialer is used to change the database access credentials the secure data processing application used to access the encrypted data.

20 Claims, 7 Drawing Sheets

(56) References Cited

U.S. PATENT DOCUMENTS

| | | | | |
|---|---|---|---|---|
| 2010/0011007 A1* | 1/2010 | Bettger | ............... | H04L 63/105 |
| | | | | 709/224 |
| 2010/0146618 A1* | 6/2010 | DelRocco | ............ | H04L 63/105 |
| | | | | 726/12 |
| 2010/0257587 A1* | 10/2010 | Chazin | ................ | H04L 67/02 |
| | | | | 726/3 |
| 2015/0379293 A1* | 12/2015 | Wang | ................ | G06F 16/951 |
| | | | | 726/7 |
| 2017/0220812 A1* | 8/2017 | Lopez | ................ | G06F 21/577 |
| 2018/0145835 A1* | 5/2018 | Barbour | ............... | H04L 63/126 |
| 2018/0314718 A1* | 11/2018 | Fernandez | ............ | G06F 16/219 |
| 2019/0052916 A1* | 2/2019 | Schwarz | .......... | H04N 21/26606 |
| 2019/0200217 A1* | 6/2019 | Li | .......................... | H04W 4/80 |
| 2019/0318112 A1* | 10/2019 | Fonseka | ............... | G06F 21/602 |
| 2019/0361916 A1* | 11/2019 | Weaver | ............... | H04L 63/20 |

\* cited by examiner

```
┌─────────────────────────────────────────────────────────────────────────┐
│ Securely process a first set of data using a first instance of a secure │
│                       data processing application                       │
│                                   402                                   │
└─────────────────────────────────────────────────────────────────────────┘
                                    │
                                    ▼
┌─────────────────────────────────────────────────────────────────────────┐
│ Determine a first set of database access credentials used by the first  │
│ instance of the secure data processing application, wherein the first   │
│ set of database access credentials is associated with a first set of    │
│                              databases                                  │
│                                   404                                   │
└─────────────────────────────────────────────────────────────────────────┘
                                    │
                                    ▼
┌─────────────────────────────────────────────────────────────────────────┐
│ Determine that the first instance of the secure data processing         │
│                       application has terminated                        │
│                                   406                                   │
└─────────────────────────────────────────────────────────────────────────┘
                                    │
                                    ▼
┌─────────────────────────────────────────────────────────────────────────┐
│ Based on the determination that the first instance of the secure data   │
│ processing application has terminated, invalidate the first set of      │
│                       database access credentials                       │
│                                   408                                   │
└─────────────────────────────────────────────────────────────────────────┘
                                    │
                                    ▼
┌─────────────────────────────────────────────────────────────────────────┐
│ Generate new database access credentials for each database in the first │
│                            set of databases                             │
│                                   410                                   │
└─────────────────────────────────────────────────────────────────────────┘
```

SYSTEMS AND METHODS FOR SECURE PROCESSING OF DATA STREAMS HAVING DIFFERING SECURITY LEVEL CLASSIFICATIONS

FIELD OF THE INVENTION

The present technology relates to the field of data security. More particularly, the present technology relates to systems and methods for secure processing of data streams with trusted, secure applications. Even more specifically, various embodiments of the present technology relate to systems and methods for secure processing of data streams having differing security level classifications in Enterprise Service Bus (ESB) environments.

BACKGROUND

Applications that process sensitive data must be architected carefully to ensure information is not being misused or compromised by the application itself. Security certifications achieved by the application may offer an organization some confidence that an application has been vetted for potential security flaws but absolute guarantees cannot be made in such evaluations. Potential security flaws may represent an even greater challenge when applications are processing classified or sensitive data with differing security classification levels.

SUMMARY

Various embodiments of the present disclosure can include systems, methods, and non-transitory computer readable media configured to receive a notification of a user request to securely process a first set of data. A time estimate is calculated, wherein the time estimate is indicative of an expected amount of time for a secure data processing application to process the first set of data. An actual utilization time required for a first instance of the secure data processing application to process the first set of data is measured. A determination is made as to whether the secure data processing application may be compromised based on a comparison of the time estimate and the actual utilization time.

In an embodiment, the first instance of the secure data processing application utilizes a first set of database access credentials to process the first set of data, and the first set of database access credentials is associated with a first set of databases.

In an embodiment, the first set of database access credentials is invalidated based on a determination that the first instance of the secure data processing application has terminated.

In an embodiment, new database access credentials are generated for each database in the first set of databases.

In an embodiment, the first instance of the secure data processing application utilizes a first set of cryptographic keys to process the first set of data.

In an embodiment, a first set of data elements that have been encrypted using the first set of cryptographic keys are decrypted based on a determination that the first instance of the secure data processing application has terminated. The first set of data elements are re-encrypted using a second set of cryptographic keys.

In an embodiment, the determining whether the secure data processing application may be compromised based on a comparison of the time estimate and the actual utilization time comprises: determining that the actual utilization time does not exceed the time estimate by greater than a threshold amount, and determining that the secure data processing application is not compromised based on the determining that the actual utilization time does not exceed the time estimate by greater than the threshold amount.

In an embodiment, the determining whether the secure data processing application may be compromised based on a comparison of the time estimate and the actual utilization time comprises: determining that the actual utilization time exceeds the time estimate by greater than a threshold amount, and determining that the secure data processing application may be compromised based on the determining that the actual utilization time exceeds the time estimate by greater than the threshold amount.

In an embodiment, a notification is generated for a user indicating that the secure data processing application may be compromised.

In an embodiment, the first instance of the secure data processing application is halted based on the determining that the secure data processing application may be compromised.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Secure Processing of Data Streams Having Differing Security Level Classifications Applications that process sensitive data must be architected carefully to ensure information is not being misused or compromised by the application itself. Security certifications achieved by the application may offer an organization some confidence that an application has been vetted for potential security flaws, but absolute guarantees cannot be made in such evaluations. Potential security flaws may represent an even greater challenge when applications are processing classified or sensitive data with differing security classification levels.

Enterprise Service Bus (ESB) applications allow for various applications and/or processes to communicate with one another and work together to perform various tasks. Certain ESB applications may be dedicated to operations for secure data processing, such as secure data transport, audit, and data transform operations. These secure data processing applications may be referred to as "SDTAT" applications or "ESB SDTAT" applications. Various example embodiments of ESB SDTAT applications are disclosed in U.S. patent application Ser. No. 15/500,905, filed Oct. 31, 2014, and entitled "SECURITY RECORD TRANSFER IN A COMPUTING SYSTEM," the entire contents of which are hereby incorporated by reference as if fully set forth herein.

ESB SDTAT applications typically require unique architectures in order to process sensitive data in a trusted fashion. Conventional approaches are generally capable of processing sensitive data at a single security classification level. However, conventional approaches have proven inadequate for securely managing streams of data that have different data security level classifications. This is due to several reasons. First there are no controls structured around the ESB SDTAT application to ensure or verify that it is truly carrying out its intended functionality. Second, the fact that ESB SDTAT applications typically leverage one or more Relational Database Management Systems (RDBMS) to stage and store data which has been or will be transformed. Generally, data in such RDBMs is secured with a single cryptographic key that protects the entire database. However, such an arrangement would be inadequate if the database contained data at differing security classification levels. If data streams with differing security classification levels were to be processed, at least one different cryptographic key would be needed to encrypt data at each security classification level. This is to allow users with varying levels of clearance to access some of the data within a database (e.g., data at security classification levels for which a user has clearance) while preventing access to other data within the database (e.g., data at security classification levels for which a user does not have clearance).

Further, in security classification, there is a concept commonly referred to as "need to know." This concept generally refers to a scenario in which, even if an individual has a clearance at a particular security classification level, it does not guarantee that the individual has a right to access all data classified at that security classification level. Certain information within a security classification level may be available only to those individuals that both have a clearance at that security classification level and also have a "need to know" the information (e.g., the information is required for a project that an individual is working on). Such information can also be referred to as "compartmentalized" information, and a single security classification level may have multiple security "compartments" within it. To manage this situation, additional cryptographic keys may need to be employed within a single security classification level to further segregate and secure data. Again, conventional approaches are ill-suited to handle scenarios in which a single database houses data secured at multiple security classification levels and/or different compartments within a single security classification level. Throughout the present disclosure, discussion of data secured at different security classification levels should be understood to include data secured within different compartments in a single classification level, and vice versa, unless it is made clear, either expressly or by context, that the discussion is relevant to only one of the two scenarios.

There are two primary security threats when a single ESB SDTAT application processes data streams classified at different security classification levels. The first threat arises from the fact that the ESB SDTAT application can access data classified at different security classification levels. It may not be unusual for a person to have a security clearance that would allow them to access sensitive information classified at different security classification levels. For example, a Top Secret security clearance holder could have access to information at a Top Secret level as well as all security classification levels below the Top Secret level, e.g., a Secret level and/or a Restricted level. However, it can be problematic for an application to have access to data classified at multiple security classification levels because an organization would need to have definitive mathematical proof that the application could not accidently or intentionally co-mingle data from different security classification levels. Secondly, there is always a risk or threat that the application might be doing something non-secure or illicit with the data. For example, such risks or threat might include:

making an extra copy of data being processed;
mixing data at various security classification levels to make them appear classified at the same security classification level;
saving cryptographic keys used to encrypt data and making them available to other rogue applications or rogue users;
saving database access credentials and making them available to other rogue applications or rogue users; and
performing unauthorized operations on data being processed.

Under conventional approaches, a single application is typically dedicated to a single classification level and processes data only at that one security classification level (or within a single security classification level compartment). If data at another security classification level (or another compartment at the same level) needs to be processed, another dedicated application instance is typically instantiated and assigned to that task. For example, this may be how an ESB SDTAT application described in U.S. patent application Ser. No. 15/500,905 could be used to process data streams containing data at different security classification levels. However, this approach can be inefficient and costly, as separate physical servers and separate databases may need to be allocated to house data at individual security classification levels and to work with different instances of the dedicated application. For example, under some conventional approaches, if data to be processed encompassed five different security classification levels, five separate servers, using five distinct databases, would be required to properly and securely process the data.

An improved approach rooted in computer technology overcomes the foregoing and other disadvantages associated with conventional approaches specifically arising in the realm of computer technology. In general, a modified ESB SDTAT architecture utilizes various applications external to an ESB SDTAT application to manage and mitigate risks associated with the ESB SDTAT application having access to data at different security classification levels. The modified ESB SDTAT architecture can receive a request to securely process a set of data. A Work Estimate Application (WEA) can generate a time estimate indicative of the amount of CPU and I/O time an ESB SDTAT application would be expected to need to process the set of data. The time estimates can be calculated based on various factors, such as hardware characteristics of a server that will be processing the data, as well as the amount of data to be processed.

Once the time estimates are received, a new instance of the ESB SDTAT application can be initiated to process the set of data. The new instance of the ESB SDTAT application can be provided with one or more cryptographic keys based on the set(s) of data it will process. For example, the set of data may be associated with one or more security classification levels, and the ESB SDTAT application instance can be provided with one or more cryptographic keys that are required to access data classified in the one or more security classification levels. The ESB SDTAT application can also be provided with database access credentials for accessing one or more databases (e.g., RDBMS's) within which the set of encrypted data is stored. A CPU I/O audit process (or application) can be utilized to measure actual utilization times, e.g., the actual amount of CPU and I/O time, required by the ESB SDTAT application instance to process the set of data.

A first check on the ESB SDTAT application can be implemented by comparing the actual CPU and I/O utilization times required by the ESB SDTAT application instance with the WEA CPU and I/O time estimates. A comparison between the actual and predicated CPU and I/O utilization times can be used to determine whether or not the ESB SDTAT application is behaving as expected. If it is not behaving as expected (e.g., the actual utilization times exceed the WEA time estimate by a threshold amount), appropriate action can be taken to correct and/or halt the ESB SDTAT application and alert appropriate organization personnel.

A second control on the ESB SDTAT application can be implemented using a re-credentialer application (or process). Once the ESB SDTAT application instance has completed (e.g., has completed processing the set of data), the re-credentialer application can invalidate any database access credentials utilized by the ESB SDTAT application instance to access encrypted data and requisition new database access credentials. In this way, the re-credentialer ensures that once the ESB SDTAT application instance has completed, database access credentials utilized by the ESB SDTAT application instance cannot be re-used, for example, by a rogue user or application, to access a database, if the ESB SDTAT instance had somehow saved those credentials to make them available to other unauthorized entities.

A third control on the ESB SDTAT application can be implemented using a re-cryptor application (or process). The re-cryptor application can be configured to change any cryptographic keys used to protect data stored in RDBMS's that were accessed by the last instance of the ESB SDTAT application. The re-cryptor application can be provided with cryptographic keys used by the last ESB SDTAT application instance. The re-cryptor application can use these keys to decrypt any data that will generally include any data that was accessed, moved, transformed, and/or otherwise interacted with by the ESB SDTAT application instance, and may include additional data (e.g., data classified at a particular security classification level, but was not utilized by the ESB SDTAT application instance). The re-cryptor application can then re-encrypt the now decrypted data using newly generated cryptographic keys, and place the newly re-encrypted data back in the databases in which they were stored. In this way, the re-cryptor application ensures that once the ESB SDTAT instance is completed, any cryptographic keys that were used by the ESB SDTAT application instance cannot be improperly obtained and re-used by any rogue party or application to illicitly access the encrypted data in the database(s).

In various embodiments, these risk mitigation checks and controls, such as the first check, the second control, and the third control described above and in more detail below, can be implemented individually or in any combination. For example, one of the risk mitigation checks/controls can be implemented in some cases. As another example, two of the risk mitigation checks/controls can be implemented in other cases. As yet another example, all three of the risk mitigation checks and controls can be implemented in yet still other cases.

Various embodiments of the present disclosure can implement the risk mitigation checks and controls on the ESB SDTAT application using discrete, external applications/processes (e.g., a work estimate application, a re-credentialer application, a re-cryptor application, etc.). These discrete, external applications perform specific, limited functions that can reliably be modeled, tested, and confirmed in a robust manner (e.g., via mathematical modeling). As such, these discrete, easily verifiable external applications can be used to ensure the reliability and security of a large ESB SDTAT application that is much more difficult to model and test (and indeed may never be totally mathematically modeled). These concepts and others will be described in greater detail herein.

Figure 1:
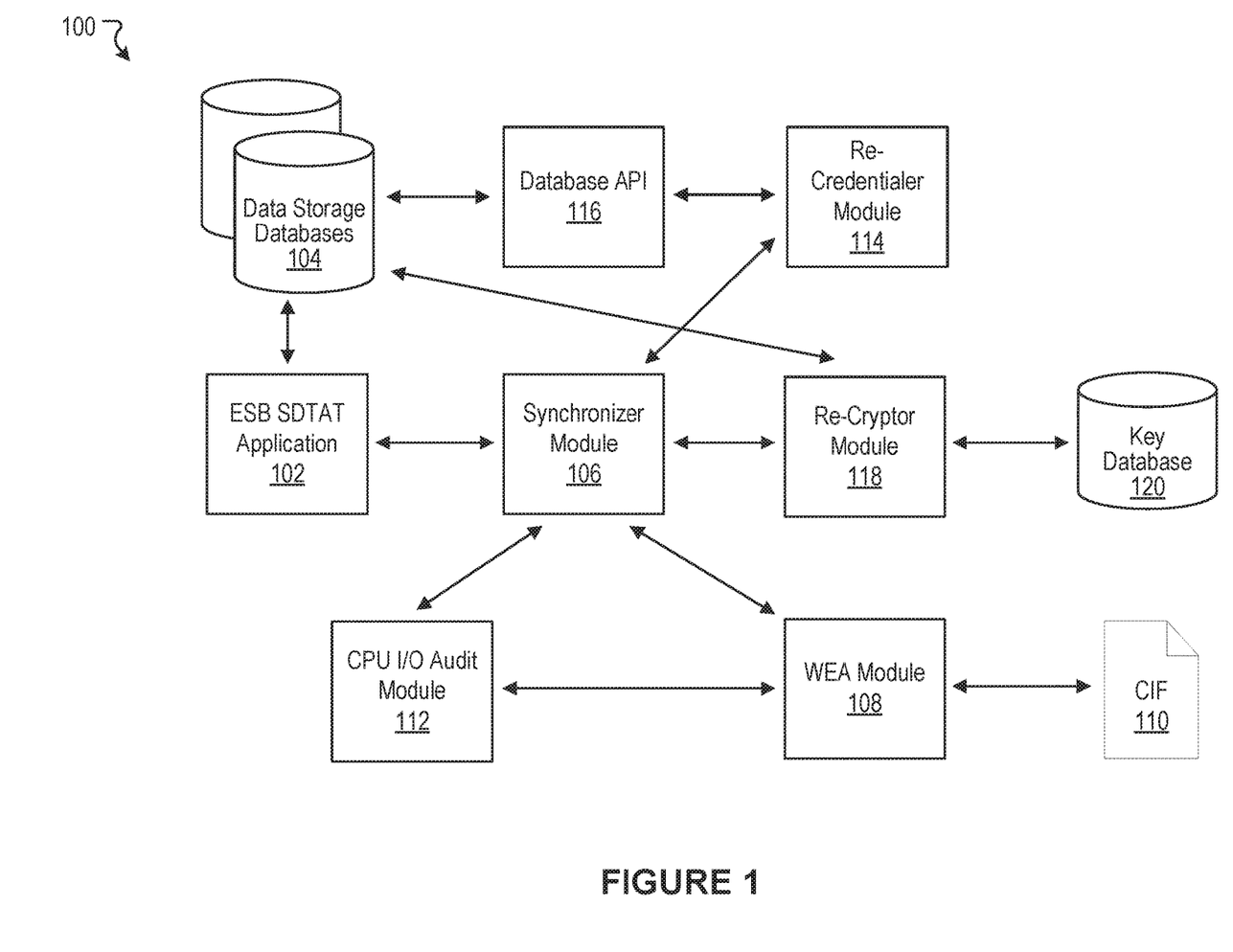
FIG. 1 illustrates an example system for secure processing of data, according to an embodiment of the present disclosure.

FIG. 1 illustrates an example system 100 for secure processing of data, according to an embodiment of the present disclosure. As shown in the example of FIG. 1, the system 100 can include an ESB SDTAT application 102, one or more data storage databases 104, a synchronizer module 106, a work estimate application (WEA) module 108, a CPU I/O audit module 112, a re-credentialer module 114, and a re-cryptor module 118. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the various modules, applications, and/or elements can be implemented in any suitable combinations.

In some embodiments, the various modules and/or applications described herein can be implemented, in part or in whole, as software, hardware, or any combination thereof. In general, a module and/or an application, as discussed herein, can be associated with software, hardware, or any combination thereof. In some implementations, one or more functions, tasks, and/or operations of modules and/or applications can be carried out or performed by software routines, software processes, hardware, and/or any combination thereof. In some cases, the various modules and/or applications described herein can be implemented, in part or in whole, as software running on one or more computing devices or systems, such as on a user or client computing device or on a server. For example, one or more modules and/or applications described herein, or at least a portion thereof, can be implemented as or within an application (e.g., app), a program, or an applet, etc., running on a user computing device or a client computing system. In another example, one or more modules and/or applications, or at least a portion thereof, can be implemented using one or more computing devices or systems that include one or more servers, such as network servers or cloud servers. It should be understood that there can be many variations or other possibilities.

The ESB SDTAT application 102 can be configured to decrypt data, transform data, encrypt data, and/or move data from one storage location to another while additionally recording an audit record of every action it initiates. In various embodiments, the ESB SDTAT application 102 may perform these operations in response to a user request to securely process a set of data. Data to be processed by the ESB SDTAT application 102 can be stored within various databases, such as the data storage databases 104. Access to the various databases 104 can be controlled using database access credentials, and the data stored in the databases can be encrypted using one or more cryptographic keys. For example, each database may have its own set of database access credentials, and data stored in the databases may be encrypted using one or more cryptographic keys. In certain embodiments, a particular cryptographic key may be associated with a particular security classification level, or particular compartment within a security classification level, such that all data at the particular security classification level or all data within the compartment of the security classification level is encrypted using the particular cryptographic key. Multiple cryptographic keys may be used to encrypt different sets of data possessing different security classification levels (e.g., data classified at a first security classification level can be encrypted using a first cryptographic key, data classified at a second security classification level can be encrypted using a second cryptographic key, etc.). In various embodiments, a single database may store data classified at differing levels of security classification, and, accordingly, encrypted with different cryptographic keys.

As mentioned above, a user request can be received to securely process a set of data. In various embodiments, the set of data may comprise data having one or more security classification levels, encrypted with one or more cryptographic keys, and stored in one or more databases made accessible by using the appropriate database access credentials. The ESB SDTAT application 102 can be provided with any database access credentials and cryptographic keys that will be required to process the set of data identified in the user request. The ESB SDTAT application 102 can then access the various databases using the database access credentials, decrypt the data using the one or more cryptographic keys, and perform operations and/or transformations on the data based on the user request. In certain embodiments, the ESB SDTAT application 102 can be configured to transform data from multiple formats into a common format so that data can easily be compared. For example, the user requesting processing of the set of data may be a security analyst, and the user may request security data from a plurality of sources. The security data from the plurality of sources may come in a plurality of formats, and the ESB SDTAT application 102 can process the data by transforming the data into a common format, such that the data can be presented to the user for easy visualization and comparison.

The synchronizer module 106 can be configured to facilitate communications and data transfer between various elements of the system 100 implementing better checks and controls on the ESB SDTAT application. For example, the synchronizer module 106 can be configured to provide each module and/or application in the system 100 with some or all information required by those modules and/or applications to perform the tasks and functions described herein. For example, in various embodiments, the synchronizer module 106 can receive a notification of a user request for secure processing of a set of data. The synchronizer module 106 can transmit information associated with the user request to the WEA module 108 so that the WEA module 108 can generate a time estimate for how long it should take the ESB SDTAT application 102 to process the set of data, as will be described in greater detail herein. The synchronizer module 106 can also be configured to initiate an instance of the ESB SDTAT application 102 to process the set of data according to the user request. Once the ESB SDTAT application instance has finished processing the set of data and has closed, the synchronizer module 106 can receive a notification that the ESB SDTAT application instance has completed and terminated. Based on this notification, the synchronizer module 106 can call the re-credentialer module 114 to generate new database credentials, and call the re-cryptor module 118 to decrypt any data that has been encrypted using cryptographic keys utilized by the ESB SDTAT application instance, and to re-encrypt that data using newly generated cryptographic keys, as will be described in greater detail herein. Due to the fact that the synchronizer module 106 is tasked with interacting with the various elements in the system 100, various functions of the synchronizer module 106 will be described in greater detail herein while discussing the functions and tasks of the other elements in the system 100.

The WEA module 108 can be configured to generate a CPU and I/O time estimates indicative of an amount of time the ESB SDTAT application 102 is expected to need in order to process a particular set of data. In certain embodiments, the time estimate may be expressed in terms of resource utilization, such as CPU and/or I/O utilization time. Due to the complexity of ESB SDTAT applications, it would be very difficult to develop a robust mathematical model to prove that an ESB SDTAT application has not been compromised, e.g., to demonstrate that the ESB SDTAT application can only perform its designated functionalities and do nothing more beyond those. Thus, the presently disclosed technology introduces mitigating controls to provide high confidence that the ESB SDTAT application is performing its duties as expected. One approach to doing this is to tightly monitor CPU usage and I/O utilization. An example will best illustrate this concept. Consider a situation in which the ESB SDTAT application 102 is asked to process 100,000 data elements in a RDBMS (e.g., the data storage databases 104). For those 100,000 elements, there is an initial expectation of needed I/O activity to both read the data into the ESB SDTAT application 102 and then write it back out to the database(s) 104. There is also an expectation regarding the needed CPU activity necessary to appropriately process the 100,000 data elements in light of the type of transformations the ESB SDTAT application 102 will be asked to perform. The WEA module 108 can be configured to determine the expected I/O activity and the expected CPU activity to determine a time estimate for the ESB SDTAT application 102 to process the 100,000 elements.

As discussed above, the synchronizer module 106 can receive a notification of a user request to process a particular set of data. In response to the request, the synchronizer module 106 can instantiate an instance of the ESB SDTAT application 102 that will be tasked with processing the particular set of data. The ESB SDTAT application instance will then close once the particular set of data has been processed. In various embodiments, before the synchronizer module 106 instantiates the ESB SDTAT application 102, it can call the WEA module 108 to analyze and provide CPU and I/O time estimates for how much time the ESB SDTAT application 102 will need to process the particular set of data. The time estimates generated by the WEA module 108 can be compared to the actual CPU and I/O times utilized by the ESB SDTAT application instance in order to determine whether or not the ESB SDTAT application 102 is operating as expected.

In various embodiments, the WEA module 108 has the following characteristics:
- limited in size (e.g., limited number of lines of code) so that its operations can be reliably mathematically modeled and confirmed;
- has knowledge of the transformation operations the ESB SDTAT application 102 can perform and their CPU and I/O implications; and
- has knowledge of CPU and I/O characteristics of the different types of servers the ESB SDTAT application 102 will be running on.

In various embodiments, the latter two items in that list, i.e., the set of transformation operations that the ESB SDTAT application 102 can perform, the CPU and I/O implications of those operations, and the CPU and I/O characteristics of different classes of servers the ESB SDTAT application could be executed on, can be specified as a set of elements in a digitally signed Configuration Input File (CIF), depicted as CIF 110 in FIG. 1. The WEA module 108 can be configured to verify a digital signature on the CIF 110 and read the CIF 110 upon start-up (e.g., when the WEA module 108 is called by the synchronizer module 106). In various embodiments, the WEA module 108 can itself be a digitally signed application so that its authenticity can be verified by calling applications, such as the synchronizer module 106.

The WEA module 108 can receive data information associated with a set of data to be processed by the ESB SDTAT application 102. In certain embodiments, the data information can be provided by the synchronizer module 106. The data information can be indicative of a number of data elements in the set of data. The data information can also comprise transformation information indicative of transformations to be performed on the set of data by the ESB SDTAT application 102. The WEA module 108 can also receive server information which identifies a server and/or a server type on which the ESB SDTAT application instance will be running. Again, in various embodiments, the server information may be provided by the synchronizer module 106. The WEA module 108 will use the server information contained in the CIF (110) to identify server performance information, such as CPU and I/O characteristics for the server. Server information and server performance information may be important features for the WEA module 108 to consider in making its work time estimates needed for the ESB SDTAT to execute, as one server may require more time to perform a particular task compared to another server performing the same task. Based on the server information, and/or the server performance information, the WEA module 108 can derive an execution time estimate for the particular instance of the ESB SDTAT application 102 that will be instantiated to process the set of data. The time estimate can comprise a CPU usage portion and an I/O utilization portion.

Misstating the processor platform and/or server that an ESB SDTAT application instance will be running on could be a potential attack vector in the described framework. This is due to the fact that server information and/or server performance information can be manipulated to, for example, cause the time estimate to be increased, such that the actual utilization time will never exceed the time estimate. As such, in various embodiments, the WEA module 108 may be invoked by the synchronizer module 106 in an auditable fashion so that the correct processor specification and/or server information can be confirmed by a third party audit.

The CPU I/O audit module 112 can be configured to measure actual utilization time for an ESB SDTAT application instance to process a set of data. In various embodiments, the CPU I/O audit module 112 can measure CPU usage time and I/O utilization time for an ESB SDTAT application instance. The actual utilization time used by an ESB SDTAT application instance can be compared to the time estimate generated by the WEA module 108 to determine whether or not the ESB SDTAT application 102 is operating as expected. For example, if the actual utilization time exceeds the time estimate by a threshold amount, then the ESB SDTAT application 102 can be determined to be potentially compromised. In certain embodiments, the threshold may be a percentage threshold. For example, the ESB SDTAT application 102 can be determined to be potentially compromised if the ESB SDTAT application instance's actual utilization time exceeds a time estimate of the WEA module 108 by 20% or more.

In various embodiments, comparison of the actual utilization time measured by the CPU I/O audit module 112 and the time estimate generated by the WEA module 108 can be performed by any of the synchronizer module 106, the CPU I/O audit module 112, the WEA module 108, or any combination thereof. For example, in one embodiment, the CPU I/O audit module 112 can be provided with a time estimate by the WEA module 108. As the CPU I/O audit module 112 is measuring the actual utilization time for an ESB SDTAT application instance, the CPU I/O audit module 112 can also compare the actual utilization time with the time estimate in real time. In various embodiments, once the actual utilization time exceeds the time estimate by a threshold amount, the CPU I/O audit module 112 can cause the ESB SDTAT application instance to halt any further processing of data, or the CPU I/O audit module 112 can inform the WEA module 108 and/or the synchronizer module 106 so that they can halt the ESB SDTAT application instance. In certain embodiments, if it is determined that the actual utilization time exceeds the time estimate by a threshold amount, the synchronizer module 106, the WEA module 108, and/or the CPU I/O audit module 112 can generate a notification to be presented on a user interface to notify an analyst that the ESB SDTAT application 102 may be compromised. The notification can include the amount by which the ESB SDTAT application instance exceeded the time estimate. For example, the notification could read: "The ESB SDTAT application may be compromised. The ESB SDTAT application exceeded the work time estimate by 45%."

The re-credentialer module 114 can be configured to update database access credentials based on completion of an ESB SDTAT application instance. In order to operate on data stored in a database (e.g., the data storage databases 104), the ESB SDTAT application 102 needs to have database access credentials. If the ESB SDTAT application 102 is operating correctly, these database access credentials should be securely used by the ESB SDTAT application 102 and there should be no non-secured record of the database access credentials remaining once the ESB SDTAT application instance has completed. However, if the ESB SDTAT application 102 is operating in a non-optimal fashion, or if it has been corrupted, it is possible that the database access credentials could be improperly duplicated, or stored in a non-secure fashion, such that they can be accessed by a rogue application or user. As such, the presently disclosed system 100 mitigates these risks by invalidating database access credentials once an ESB SDTAT application instance terminates. In this way, even if a rogue application or user was to obtain the database access credentials used by an ESB SDTAT application instance, they could not be able to gain database access because the credentials would have been invalidated.

When an ESB SDTAT application instance completes and terminates, the re-credentialer module 114 can interact with an RDBMS authentication system to invalidate previously used database access credentials and establish new database access credentials to be used the next time a new instance of the ESB SDTAT application is run. In various embodiments, in order to invalidate previous database access credentials and generate new database access credentials, the re-credentialer module 114 can leverage an RDBMS DBA API, depicted as Database API 116 in FIG. 1, supporting the Data Staging Database(s) 104. In certain embodiments, the re-credentialer module 114 can leverage the database API 116 in an authenticated and secure manner, for example, by using the TLS and/or SSL protocols. As was the case with the WEA module 108, the re-credentialer module 114 can be implemented with minimal lines of code so that it can be effectively modeled, and its functionality validated. In certain embodiments, the re-credentialer module 114 can be a digitally signed application so that its authenticity can be validated by a calling application, such as the synchronizer module 106.

The re-cryptor module 118 can be configured to change cryptographic keys used to protect data stored in the data storage databases (104) based on completion of an ESB SDTAT application instance. In order for the ESB SDTAT application 102 to perform its duties, it must be able to access data stored in the database(s) 104. This not only requires database access credentials for accessing the database(s) 104, but also any cryptographic keys that were used to encrypt the data stored in the database(s) 104. As such, if a request is received to process a set of data that has one or more security classification levels; upon instantiation, the ESB SDTAT application 102 can be provided with any cryptographic keys ($K_1, K_2, \ldots, K_N$) that are needed to decrypt the sets of data to be operated on. Then, when the ESB SDTAT application instance has completed transformation and/or movement of data, the cryptographic keys can be used by the ESB SDTAT application 102 to encrypt any data that the ESB SDTAT application instance has transformed, moved, created, or otherwise interacted with. However, there may be a concern that the ESB SDTAT application 102 may be improperly saving and/or duplicating the cryptographic keys, such that they could be accessed by a rogue application or user to decrypt the data stored on the database(s) 104. As such, after an ESB SDTAT application instance has been run, the cryptographic keys that were used by the ESB SDTAT application instance to decrypt and encrypt data should be considered compromised. The re-cryptor module 118 can address these concerns by replacing previously used cryptographic keys with newly generated cryptographic keys once an ESB SDTAT application instance terminates.

In various embodiments, the re-cryptor module 118 can receive database access credentials, so that it may gain access to the one or more databases on which encrypted data is stored. In certain embodiments, the database access credentials may be the same database access credentials used by the most recent ESB SDTAT application instance. This may be the case, for example, if the re-cryptor module 118 is performing its functions before the re-credentialer module 114 updates database access credentials. In other embodiments, the database access credentials provided to the re-cryptor module 118 may be updated database access credentials generated by the re-credentialer module 114 after the most recent ESB SDTAT application instance has been terminated.

The re-cryptor module 118 can also receive the set of cryptographic keys used by the most recent ESB SDTAT application instance. The re-cryptor module 118 can be configured to identify all data elements that have been encrypted using a cryptographic key from the set of cryptographic keys used by the most recent ESB SDTAT application instance. The re-cryptor module 118 can use the set of cryptographic keys to decrypt any such data elements. The re-cryptor module 118 can then re-encrypt those data elements with newly generated cryptographic keys. Once the re-cryptor module 118 has completed re-encrypting data elements in the database(s) 104, there should not be any data elements remaining that were encrypted using the previous cryptographic set of keys that were utilized by the latest ESB SDTAT application instance.

The re-cryptor module 118 can make use of a secured key database 120 to store and update cryptographic keys and to store associations between security classification levels and/or data elements and cryptographic keys. As with the WEA module 108 and the re-credentialer module 114, the re-cryptor module 118 can be implemented with sufficiently few lines of code so that it can be effectively modeled and its functionality validated. The re-cryptor module 118 can also be digitally signed so that a calling application, such as the synchronizer module 106, can validate its authenticity.

In various embodiments, the concepts described herein may have some impact on database schema. Specifically, in order for a single database to house data elements having differing security classification levels, database tables can include a field specifying a security classification level (and possibly whether a data element should be considered compartmentalized at its security classification level) for all data elements in a database. Using the database table, the re-cryptor module 118 can quickly identify which data elements are encrypted using a particular cryptographic key (e.g., by identifying which data elements are classified at a particular security classification level). By doing so, the re-cryptor module 118 can easily identify which data elements must be re-encrypted after a cryptographic key has been disclosed (and used) by an ESB SDTAT application instance. Further, this database schema will allow the re-cryptor module 118 to select the correct old key in the key database 120 in order to decrypt the data and to correctly select the newly generated cryptographic key in the key database 120 to re-encrypt the data.

Furthermore, Format Preserving Encryption (FPE) can be utilized when protecting data elements in the database(s) 104. Since FPE encryption is deterministic, an entire database table or database does not have to be decrypted when a specific query needs to be made. Instead, an application can encrypt any data elements associated with the data to be queried and then perform the query using the FPE encrypted elements. Results can then be decrypted and processed, one at a time, and results can be re-encrypted and placed back into the database.

Figure 2:
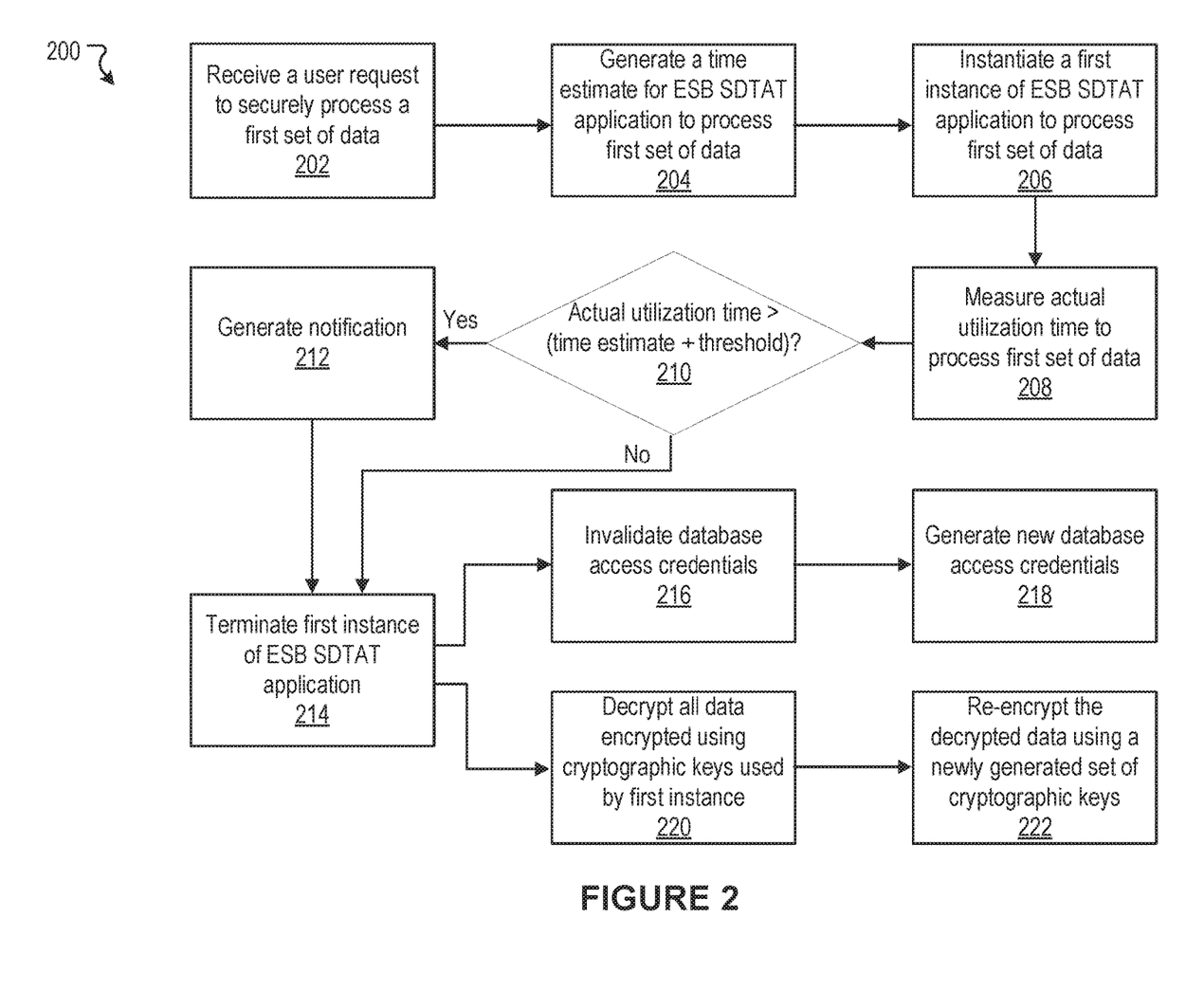
FIG. 2 illustrates a functional block diagram associated with secure processing of data, according to an embodiment of the present disclosure.

FIG. 2 illustrates an example functional block diagram 200 associated with secure processing of data, according to an embodiment of the present disclosure. At block 202, a user request is received to securely process a first set of data. At block 204, a time estimate is generated for an ESB SDTAT application to process the first set of data. At block 206, a first instance of the ESB SDTAT application is instantiated to process the first set of data. At block 208, the actual utilization time for the first instance of the ESB SDTAT application to process the first set of data is measured. At block 210, a determination is made as to whether the actual utilization time exceeds the time estimate by more than a threshold amount. If the actual utilization time does exceed the time estimate by more than a threshold amount, a notification is generated at block 212. The notification can inform a user, such as a security analyst that the ESB SDTAT application may be compromised. If the actual utilization time does not exceed the time estimate by more than a threshold amount, no notification is generated, and the first instance of the ESB SDTAT application is terminated at block 214.

Once the first instance of the ESB SDTAT application is terminated, two actions are taken: re-credentialing and re-crypting. At block 216, all database access credentials that were utilized by the first instance of the ESB SDTAT application are invalidated. At block 218, new database access credentials are generated for all databases that have had their database access credentials invalidated in block 216. At block 220, all data that has been encrypted using cryptographic keys that were utilized by the first instance of the ESB SDTAT application are decrypted. At block 222, the decrypted data is re-encrypted using a newly generated set of cryptographic keys. Although the example functional block diagram 200 depicts the re-credentialing and re-crypting operations as being performed in parallel, it should be understood that they may be performed serially (e.g., re-credentialing and then re-crypting, or vice versa) or alternatively. In fact, in certain embodiments, it may be the case that re-credentialing and re-crypting must be performed serially to ensure that access credentials provided to the re-cryptor are not invalidated by a parallel process before the re-cryptor can access the database.

Figure 3:
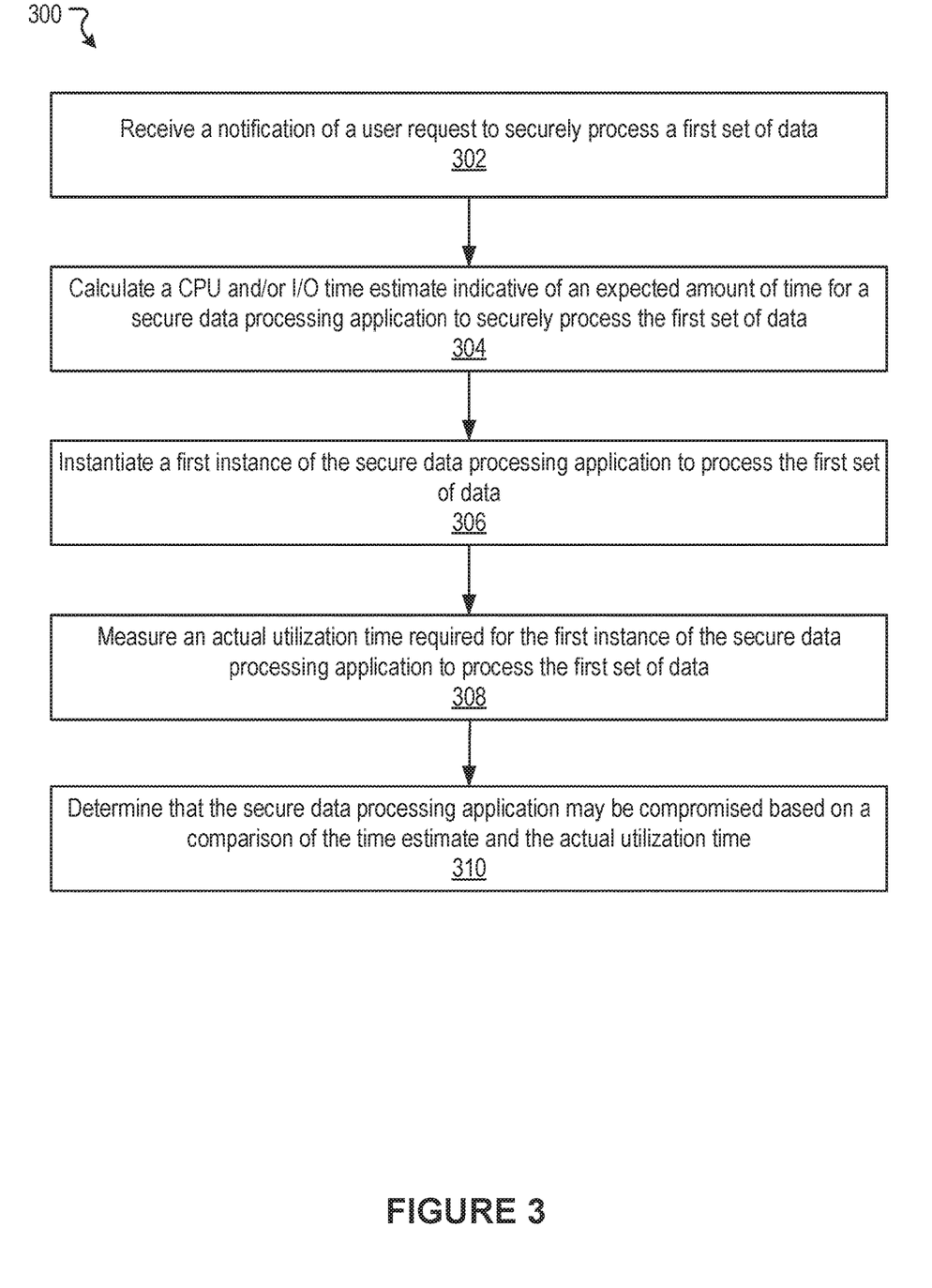
FIG. 3 illustrates an example method associated with confirming that a secure data processing application is carrying out its intended functionality based on a work time estimate, according to an embodiment of the present disclosure.

FIG. 3 illustrates an example method 300 associated with confirming that a secure data processing application (e.g., an ESB SDTAT application) has not been compromised based on a work time estimate, according to an embodiment of the present disclosure. It should be appreciated that there can be additional, fewer, or alternative steps performed in similar or alternative orders, or in parallel, within the scope of the various embodiments discussed herein unless otherwise stated.

At block 302, the example method 300 can receive a notification of a user request to securely process a first set of data. At block 304, the example method 300 can calculate a time estimate indicative of an expected amount of time for a secure data processing application to securely process the first set of data. At block 306, the example method 300 can instantiate a first instance of the secure data processing application to process the first set of data. At block 308, the example method 300 can measure an actual utilization time required for the first instance of the secure data processing application to process the first set of data. At block 310, the example method 300 can determine that the secure data processing application may be compromised based on a comparison of the time estimate and the actual utilization time.

Figure 4:
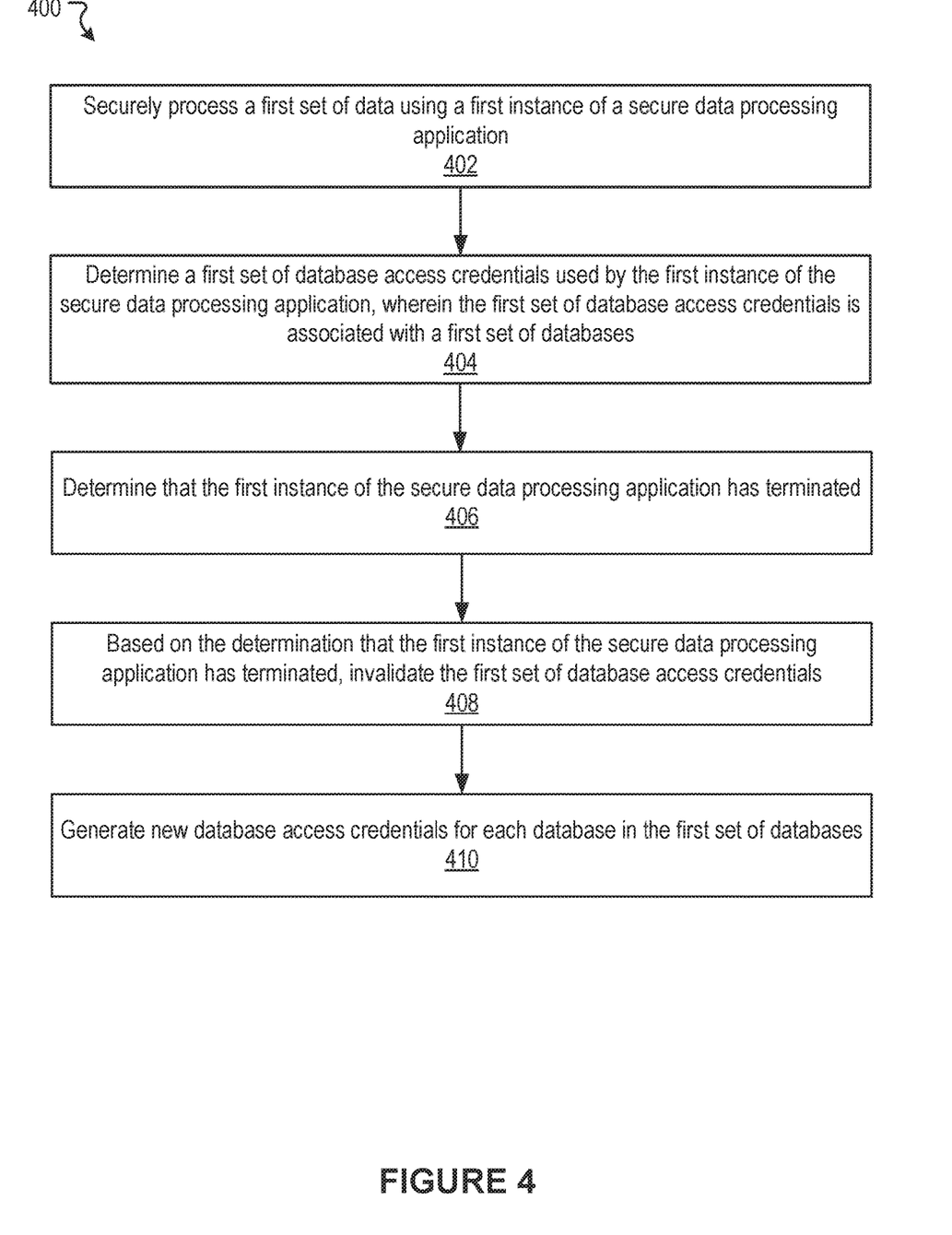
FIG. 4 illustrates an example method associated with re-credentialing one or more databases used by an instance of a secure data processing application, according to an embodiment of the present disclosure.

FIG. 4 illustrates an example method 400 associated with re-credentialing one or more databases based on an instance of a secure data processing application, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can securely process a first set of data using a first instance of a secure data processing application. At block 404, the example method 400 can determine a first of set of database access credentials used by the first instance of the secure data processing application, wherein the first set of database access credentials is associated with a first set of databases. At block 406, the example method 400 can determine that the first instance of the secure data processing application has terminated. At block 408, the example method 400 can, based on the determination that the first instance of the secure data processing application has terminated, invalidate the first set of database access credentials. At block 410, the example method 400 can generate new database access credentials for each database in the first set of databases.

Figure 5:
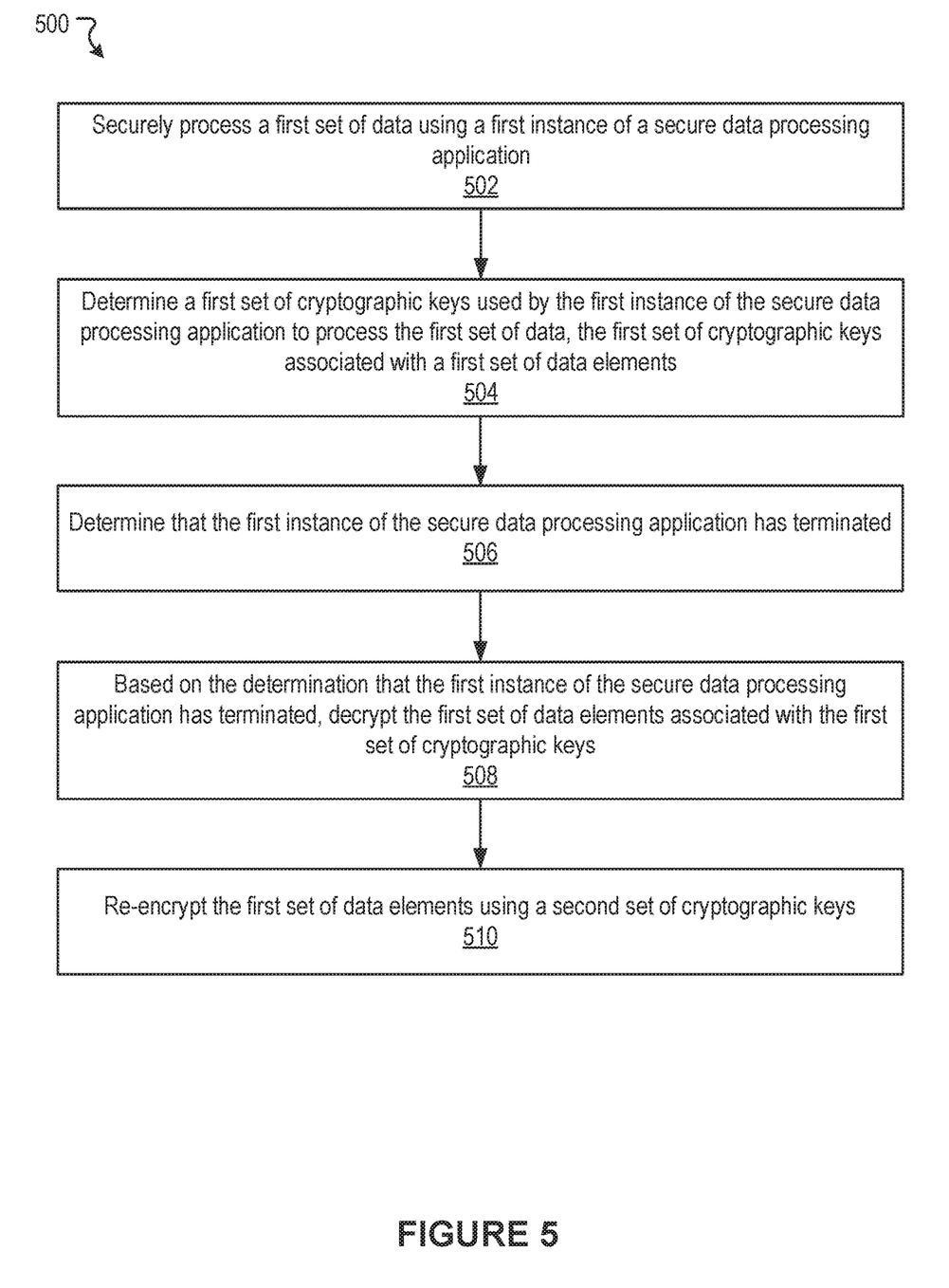
FIG. 5 illustrates an example method associated with re-encrypting data previously accessed by an instance of a secure data processing application, according to an embodiment of the present disclosure.

FIG. 5 illustrates an example method 500 associated with re-encrypting data based on an instance of a secure data processing application, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can securely process a first set of data using a first instance of a secure data processing application. At block 504, the example method 500 can determine a first set of cryptographic keys used by the first instance of the secure data processing application to process the first set of data, the first set of cryptographic keys associated with a first set of data elements. At block 506, the example method 500 can determine that the first instance of the secure data processing application has terminated. At block 508, the example method 500 can, based on the determination that the first instance of the secure data processing application has terminated, decrypt the first set of data elements associated with the first set of cryptographic keys. At block 510, the example method 500 can re-encrypt the first set of data elements using a second set of cryptographic keys.

Figure 6:
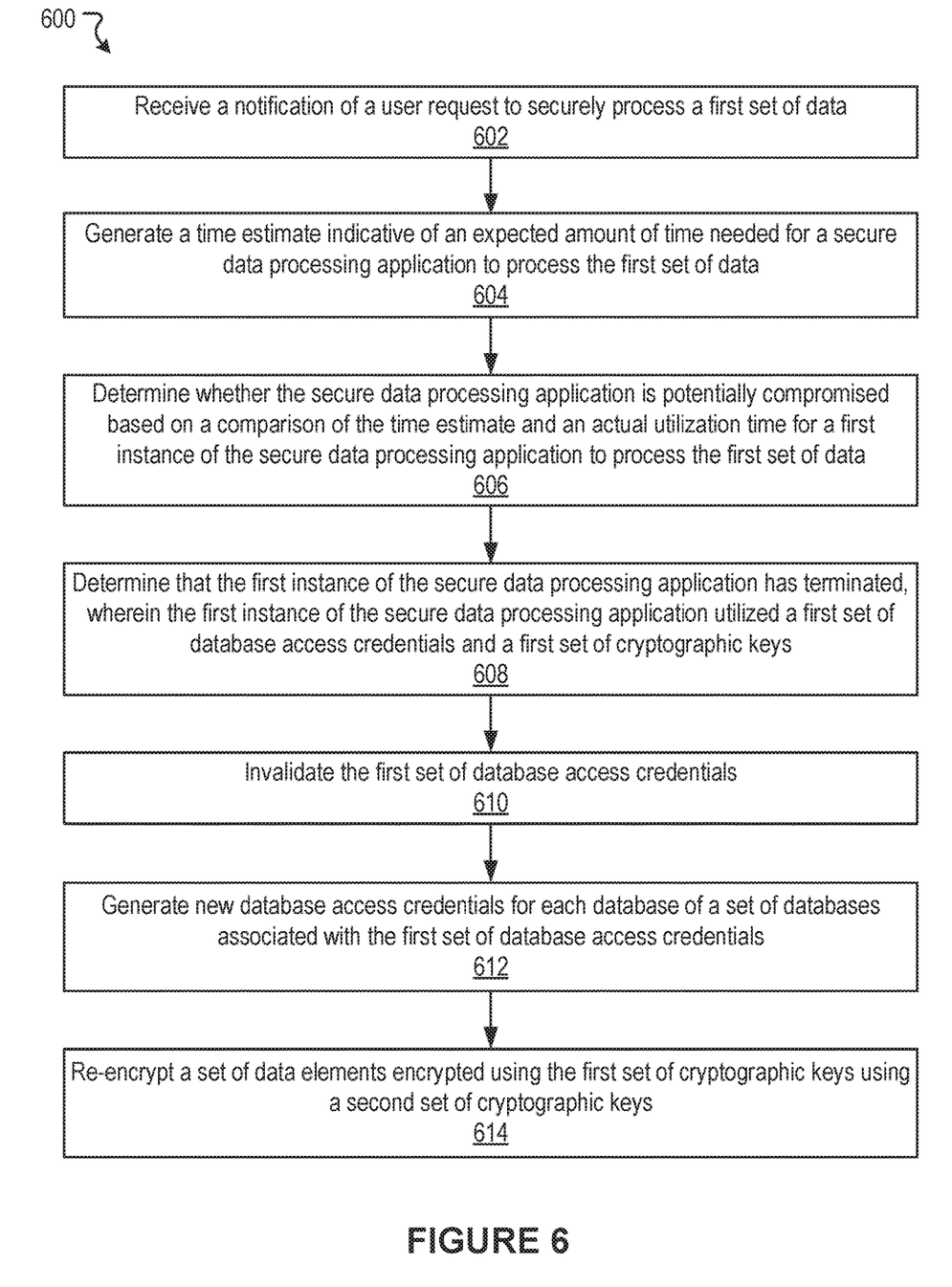
FIG. 6 illustrates an example method associated with secure processing of data, according to an embodiment of the present disclosure.

FIG. 6 illustrates an example method 600 associated with secure processing of data, according to an embodiment of the present disclosure. It should be appreciated that there can be additional, fewer, or alternative steps performed in similar or alternative orders, or in parallel, within the scope of the various embodiments discussed herein unless otherwise stated.

At block 602, the example method 600 can receive a notification of a user request to securely process a first set of data. At block 604, the example method 600 can generate a time estimate indicative of an expected amount of time needed for a secure data processing application to process the first set of data. At block 606, the example method 600 can determine whether the secure data processing application is potentially comprised based on a comparison of the time estimate and an actual utilization time for a first instance of the secure data processing application to process the first set of data. At block 608, the example method 600 can determine that the first instance of the secure data processing application has terminated, wherein the first instance of the secure data processing application utilized a first set of database access credentials and a first set of cryptographic keys. At block 610, the example method 600 can invalidate the first set of database access credentials. At block 612, the example method 600 can generate new database access credentials for each database of a set of databases associated with the first set of database access credentials. At block 614, the example method 600 can re-encrypt a set of data elements encrypted using the first set of cryptographic keys using a second set of cryptographic keys.

It is contemplated that there can be many other uses, applications, and/or variations associated with the various embodiments of the present disclosure.

Hardware Implementation

Figure 7:
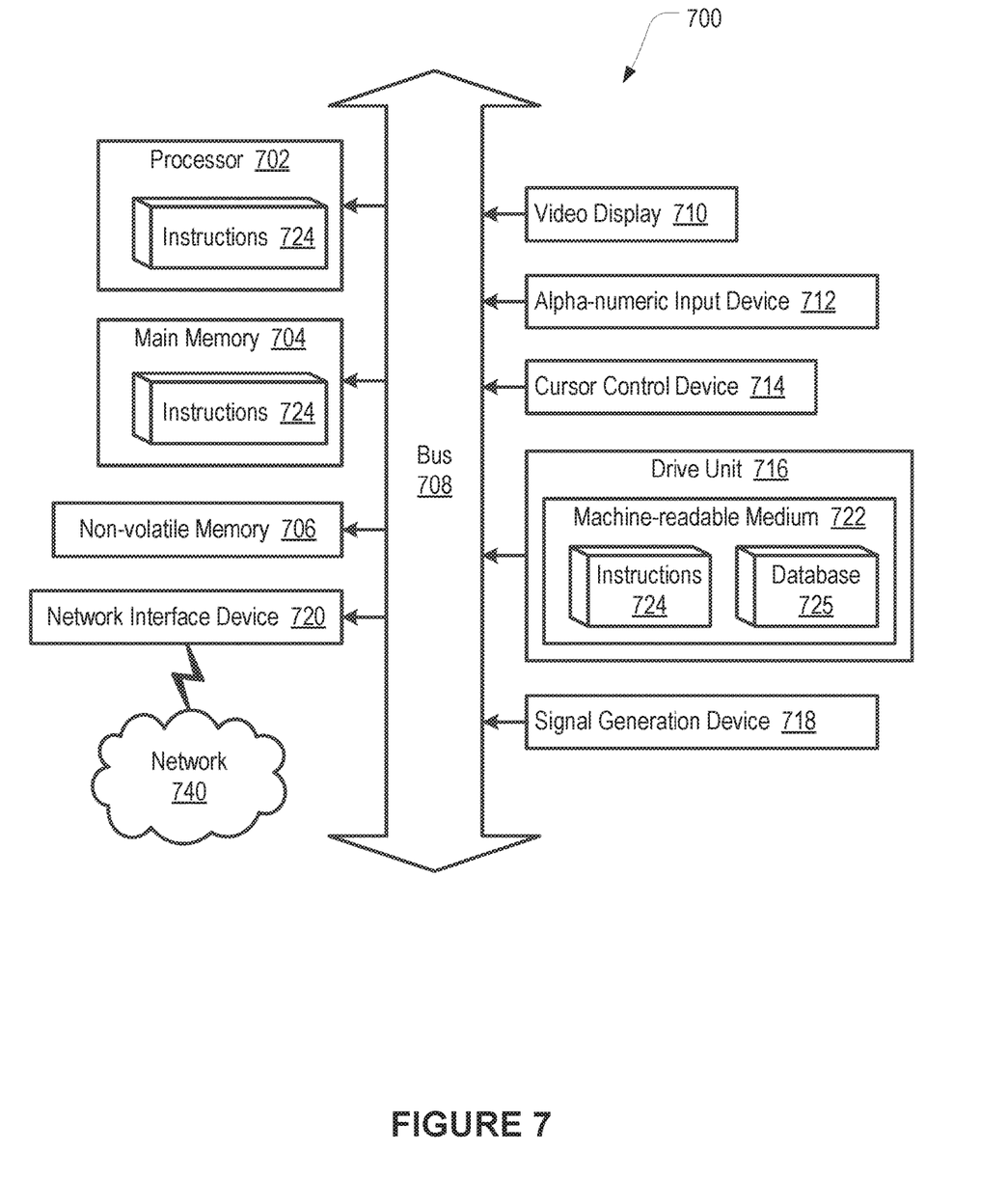
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions 724 for causing the computer system 700 to perform the processes and features discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a drive unit 716, a signal generation device 718 (e.g., a speaker) and a network interface device 720.

In one embodiment, the video display 710 includes a touch sensitive screen for user input. In one embodiment, the touch sensitive screen is used instead of a keyboard and mouse. The disk drive unit 716 includes a machine-readable medium 722 on which is stored one or more sets of instructions 724 (e.g., software) embodying any one or more of the methodologies or functions described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 725.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module or sequence of instructions referred to as "programs" or "applications". For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 700 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "in various embodiments," or the like means that a particular feature, design, structure, or characteristic described in connection with the embodiment is included in at least one embodiment of the disclosure. The appearances of, for example, the phrases "according to an embodiment", "in one embodiment" "in an embodiment" "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention, both independently and as an overall system, and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a notification of a user request to securely process a first set of data;
   calculating, by the computing system, a time estimate indicative of an expected amount of time for a secure data processing application to process the first set of data;
   measuring, by the computing system, an actual utilization time required for a first instance of the secure data processing application to process the first set of data, wherein the first instance of the secure data processing application utilizes a first set of database access credentials associated with a first set of databases to process the first set of data;
   determining, by the computing system, whether the secure data processing application may be compromised based on a comparison of the time estimate and the actual utilization time; and
   invalidating, by the computing system, the first set of database access credentials based on a determination that the first instance of the secure data processing application has terminated.

2. The computer-implemented method of claim 1, wherein
   the time estimate is calculated based on at least one of: an expected computer processing unit (CPU) usage, an expected input output utilization, or a number of data elements associated with the user request.

3. The computer-implemented method of claim 1, wherein the first set of data is associated with a security classification level and the first set of data is encrypted using a cryptographic key associated with the security classification level.

4. The computer-implemented method of claim 1, further comprising generating new database access credentials for each database in the first set of databases.

5. The computer-implemented method of claim 1, wherein
the first instance of the secure data processing application utilizes a first set of cryptographic keys to process the first set of data.

6. The computer-implemented method of claim 5, further comprising:
based on the determination that the first instance of the secure data processing application has terminated, decrypting a first set of data elements that have been encrypted using the first set of cryptographic keys, and
re-encrypting the first set of data elements using a second set of cryptographic keys.

7. The computer-implemented method of claim 1, wherein the determining whether the secure data processing application may be compromised based on a comparison of the time estimate and the actual utilization time comprises:
determining that the actual utilization time does not exceed the time estimate by greater than a threshold amount, and
determining that the secure data processing application is not compromised based on the determining that the actual utilization time does not exceed the time estimate by greater than the threshold amount.

8. The computer-implemented method of claim 1, wherein the determining whether the secure data processing application may be compromised based on a comparison of the time estimate and the actual utilization time comprises:
determining that the actual utilization time exceeds the time estimate by greater than a threshold amount, and
determining that the secure data processing application may be compromised based on the determining that the actual utilization time exceeds the time estimate by greater than the threshold amount.

9. The computer-implemented method of claim 8, further comprising generating a notification for a user indicating that the secure data processing application may be compromised.

10. The computer-implemented method of claim 8, further comprising halting the first instance of the secure data processing application based on the determining that the secure data processing application may be compromised.

11. A system comprising:
at least one processor; and
a memory storing instructions that, when executed by the at least one processor, cause the system to perform a method comprising:
receiving a notification of a user request to securely process a first set of data;
calculating a time estimate indicative of an expected amount of time for a secure data processing application to process the first set of data;
measuring an actual utilization time required for a first instance of the secure data processing application to process the first set of data, wherein the first instance of the secure data processing application utilizes a first set of database access credentials associated with a first set of databases to process the first set of data;
determining whether the secure data processing application may be compromised based on a comparison of the time estimate and the actual utilization time; and
invalidating the first set of database access credentials based on a determination that the first instance of the secure data processing application has terminated.

12. The system of claim 11, wherein
the time estimate is calculated based on at least one of: an expected computer processing unit (CPU) usage, an expected input output utilization, or a number of data elements associated with the user request.

13. The system of claim 11, wherein
the first set of data is associated with a security classification level and the first set of data is encrypted using a cryptographic key associated with the security classification level.

14. The system of claim 11, wherein the method further comprises generating new database access credentials for each database in the first set of databases.

15. The system of claim 11, wherein
the first instance of the secure data processing application utilizes a first set of cryptographic keys to process the first set of data, and
the method further comprises:
based on a determination that the first instance of the secure data processing application has terminated, decrypting a first set of data elements that have been encrypted using the first set of cryptographic keys, and
re-encrypting the first set of data elements using a second set of cryptographic keys.

16. A non-transitory computer-readable storage medium including instructions that, when executed by at least one processor of a computing system, cause the computing system to perform a method comprising:
receiving a notification of a user request to securely process a first set of data;
calculating a time estimate indicative of an expected amount of time for a secure data processing application to process the first set of data;
measuring an actual utilization time required for a first instance of the secure data processing application to process the first set of data, wherein the first instance of the secure data processing application utilizes a first set of database access credentials associated with a first set of databases to process the first set of data;
determining whether the secure data processing application may be compromised based on a comparison of the time estimate and the actual utilization time; and
invalidating the first set of database access credentials based on a determination that the first instance of the secure data processing application has terminated.

17. The non-transitory computer-readable storage medium of claim 16, wherein
the time estimate is calculated based on at least one of: an expected computer processing unit (CPU) usage, an expected input output utilization, or a number of data elements associated with the user request.

18. The non-transitory computer-readable storage medium of claim 16, wherein
the first set of data is associated with a security classification level and the first set of data is encrypted using a cryptographic key associated with the security classification level.

19. The non-transitory computer-readable storage medium of claim 16, wherein the method further comprises generating new database access credentials for each database in the first set of databases.

20. The non-transitory computer-readable storage medium of claim 16, wherein the first instance of the secure data processing application utilizes a first set of cryptographic keys to process the first set of data, and the method further comprises:

based on a determination that the first instance of the secure data processing application has terminated, decrypting a first set of data elements that have been encrypted using the first set of cryptographic keys, and re-encrypting the first set of data elements using a second set of cryptographic keys.

\* \* \* \* \*